Dec. 2, 1952 K. SEILER, 3RD 2,620,425
ART OF SOLDERING CANS
Filed Jan. 5, 1950

INVENTOR.
Karl Seiler, 3rd.
BY
Caesar and Rivise
ATTORNEYS

Patented Dec. 2, 1952

2,620,425

UNITED STATES PATENT OFFICE 2,620,425

ART OF SOLDERING CANS

Karl Seiler, 3rd, Lafayette Hill, Pa.

Application January 5, 1950, Serial No. 136,937

14 Claims. (Cl. 219—12)

This invention relates to the art of soldering cans, and particularly to the soldering of cans by means of high frequency induction heating. The invention is not limited in its application to any specific type of can, but lends itself particularly well to the soldering of cans for containing foodstuffs such as meats. The most promising application is for soldering the cap on a ham can, and because of this fact the invention will be described with particular reference to this application, it being understood that the following disclosure is illustrative and not in any way restrictive of the invention.

By way of introduction, it may be stated that the ham canning process involves the following operations: (1) weighing, (2) filling the cans, (3) adding gelatin, (4) capping, (5) soldering the cap, (6) vacuumizing, (7) soldering the vacuumizing aperture, and (8) cooking. Of all said operations, the cap soldering operation consumes the most time. In fact all the other operations can generally be performed in substantially less time than the single cap soldering step. It follows that the cap soldering operation constitutes the greatest obstacle to a high rate of production in the canning industry.

The primary object of the invention is to greatly increase the rate of the cap soldering operation, thereby materially speeding up the process and substantially reducing the costs in the canning operation.

Another important object is to provide an electronic method for soldering cans, which is relatively free of the disadvantages and shortcomings of prior art methods, and which can be practiced on a large commercial scale by relatively simple, inexpensive apparatus.

Another object of importance is to provide an electronic can soldering apparatus, which is of relatively simple, compact, inexpensive, rugged construction, having a comparatively few parts, which is characterized by the absence of complex auxiliary equipment, which is very efficient and effective for its intended purpose, and which requires a minimum amount of attention, maintenance, servicing and adjustment to keep it in good working order.

Another important object is to provide an electronic method and apparatus for soldering cans, which produce better and tighter seams in much less time than prior methods and devices at greatly reduced cost and which consume much less solder.

Another object of importance is to provide an electronic method and apparatus for soldering cans, which bring about much better working conditions and eliminate undesirable heat and smell.

A further object is to provide an electronic soldering method and apparatus which produce more uniform results and more presentable cans.

Other objects as well as advantages will appear as the description proceeds.

In its essence, the method of the invention consists in applying a solder along the seam, and subjecting the seam to the action of an electromagnetic oscillatory field for a brief interval of time to heat the material of the can along the seam and the solder above the melting point of the solder, thereby producing an intimate bond between the metal and the solder.

This method is particularly well adapted for the soldering of the tin-plated type of can now in conventional use in the meat industry. For this particular type of can, it is preferred to use a solder containing an alloy of tin (30%) and lead (70%) in addition to a suitable flux. The tin plate has a melting point about 450° F., and the solder melts at about 410° F. Heating the seam to about 500° F. simultaneously fuses both the tin plate and the solder and brings the solder into intimate contact with clean unoxidized tin plate. The oscillatory field is preferably in the order of 400,000 cycles, and the power utilized is about 1000 watts.

The apparatus of the invention comprises a worktable formed of a heat-resistant dielectric material provided with a cavity having substantially the same contour as that of the can to be soldered, and a work coil substantially concentric with the vertical wall of the cavity embedded in the table, the terminals of the coil being electrically connected into the circuit of an electronic power generator.

In the preferred embodiment, the circuit between the work coil and the power generator has a normally open switch and a normally closed switch, the normally open switch being adapted to be closed by the positioning of a can within the cavity, and the normally closed switch being time-controlled so as to be opened automatically at the end of the heating cycle and being adapted to be closed again by the removal of the can from within the cavity.

Referring briefly to the drawings, wherein the presently preferred embodiment of the invention is shown for illustrative and exemplary purposes, it will be seen that:

Figure 1:
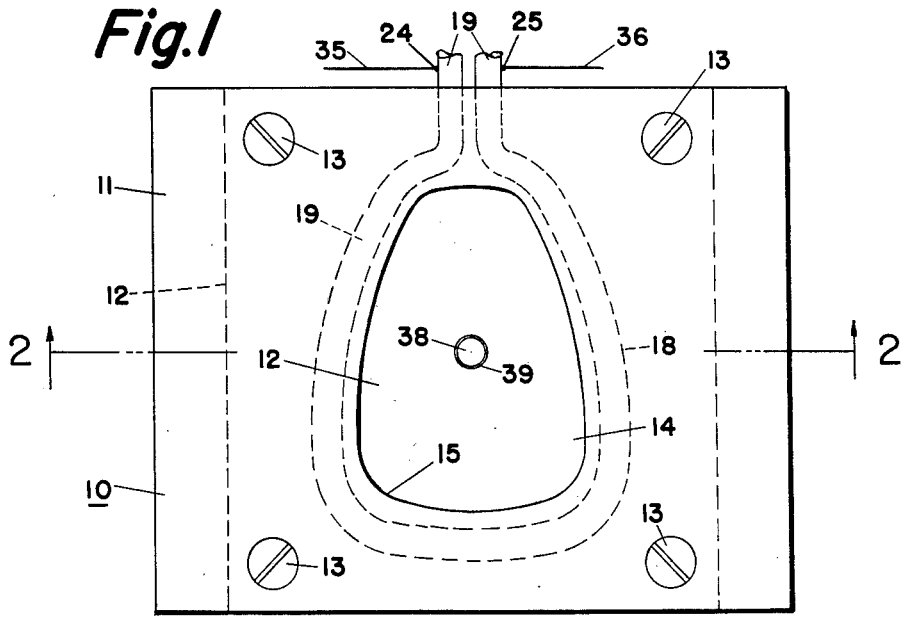
Figure 1 is a plan view of the apparatus.

Referring to the drawings in greater detail, it will be seen that the worktable of the apparatus, which is denoted generally by 10, is preferably formed of two slabs 11 and 12 of a heat-resistant dielectric material. In practice, it has been found that asbestos-cement materials exemplified by "Transite" are admirably suited for this purpose. The two slabs are secured together in a suitable manner, such as by means of screws and bolts indicated by 13. The upper slab 11 has a hole 14 formed therein of a shape and size to receive the container or can to be soldered. The wall of the hole is denoted by 15. The shape shown in the drawings corresponds to the peripheral contour of a can for hams. The lower marginal edge of the upper slab about the hole is provided with a downwardly projecting lip 16, which fits snugly into a groove 17 of corresponding shape and contour cut in the upper surface of the lower slab 12. It will be understood that a suitable heat-resisting dielectric adhesive bonding material such as Glyptal may be interposed between the contacting surfaces of the two slabs. The purpose of the wall 15 and the lip 16 is to maintain the proper spacing ($\frac{1}{8}'' \pm \frac{1}{16}''$) between the can and the work coil and to prevent the solder from coming into contact with the coil and causing undesirable arcing and the drawing of excessive current.

Figure 2:
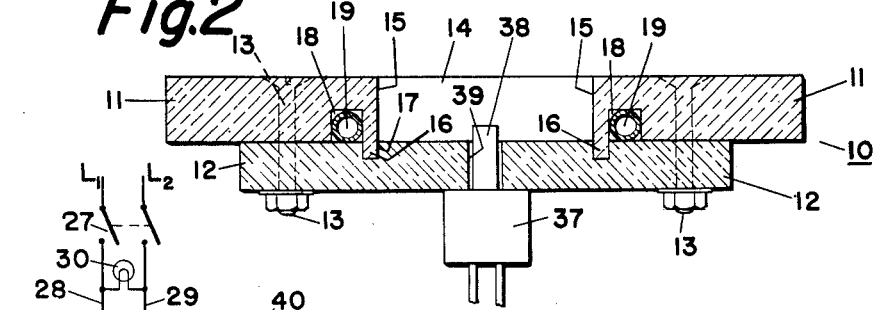
Figure 2 is a cross-sectional view taken on line 2—2 of Figure 1, looking in the direction of the arrows.
Figure 3:
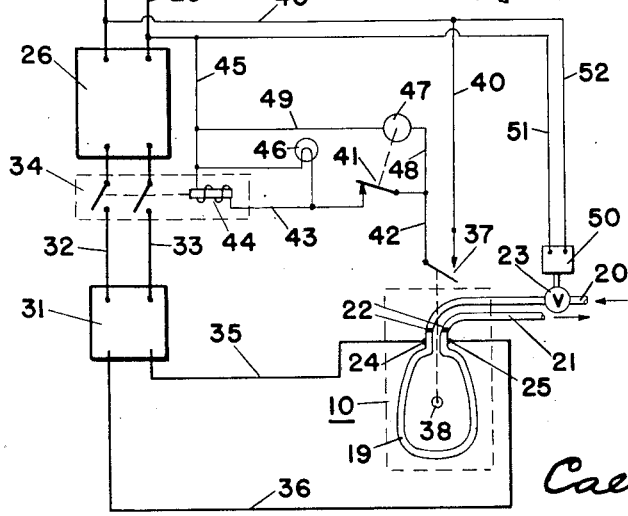
Figure 3 is a schematic circuit diagram for the apparatus.

As shown in Figure 2, the lower surface of the upper slab 11 is formed with a groove 18, which is substantially concentric with the wall 15 of the hole 14. This groove receives the work coil 19, which is in the form of a metal tube. This coil has a suitable coolant such as water circulated through it to prevent excessive temperature in the coil. The supply line for the coolant is indicated in Figure 3 by the numeral 20 and the return line by 21. The supply lines 20 and 21 are insulated from the work coil as indicated by 22. A valve 23 is shown provided in the supply line 20 for a purpose which will be hereinafter pointed out.

It will be understood from the foregoing description that the upper surface of the lower slab 12 constitutes a floor to the cavity formed by the hole 14, and that this cavity is adapted to receive a can to be soldered.

The coil terminals are electrically connected as at 24 and 25 into the circuit of an electronic power generator 26. In actual practice, excellent results have been obtained by use of RCA Model 1-AL electronic power generator, which is an electron tube unit designed for the conversion of electrical power from the commercial 60 cycle supply to a frequency of approximately 400,000 cycles per second, and which employs a self-excited Colpitts oscillator circuit with a single phase full-wave rectifier.

The generator is connected to a source of electric current $L_1$ $L_2$ through a main switch 27. The connections from the generator to the switch are denoted by 28, 29. An incandescent lamp 30 is connected across the lines 28, 29 to indicate whether or not current is flowing to the generator. An output transformer 31 is connected to the generator by means of wires 32, 33. Current from the generator to the transformer is controlled by a relay, which is designated generally by 34. The output side of the transformer 31 is connected to the work coil 19 by means of the leads 35 and 36 at the points 24 and 25 previously referred to.

The operation of the relay 34 is controlled by a circuit containing a switch 37, which may advantageously be a switch of the type available on the market under the trade-mark "Micro-Switch." The switch has a plunger 38 adapted to be depressed whenever it is desired to start the heating cycle. The plunger 38 is preferably disposed so as to project upwardly through an aperture 39 provided substantially centrally of the cavity in the soldering table. One side of the switch 37 is connected to lead 28 by means of a wire 40, and the other side is connected to a normally closed motor-timed switch 41 by means of the wire 42. The other side of switch 41 is connected by means of lead 43 to one end of the coil 44 of the relay 34. The opposite end of coil 44 is connected to the line 29 by means of the wire 45. An incandescent lamp 46 is located in parallel with the relay 34 so as to indicate visually whether the relay is operating.

The reference numerals 47 denote the timing motor for operating the switch 41 after a predetermined time interval. One side of this motor is connected by means of wire 48 to the lead 42 from the switch 37, and the other side thereof is connected by means of wire 49 to the lead 45 from the line 29.

The reference numeral 50 designates a solenoid associated with the valve 23 in the coolant supply line 20. This solenoid is wired to the lines 28 and 29 of the circuit by means of the leads 51 and 52, so that it serves to open and close the valve 23 upon actuation of the switch 27, thus assuring a flow of coolant through the work coil 19 whenever the generator 26 is turned on.

The manner of using and operating the apparatus of the invention will now be described. The main switch 27 is closed, causing current to be supplied to the power generator 26, and opening the valve 23 so as to cause a flow of coolant through the coil 19. The light 30, which may be red and which is preferably located so as to be in full view of the operator stationed at the worktable, goes on indicating that the power generator is functioning. In the meantime, the cans are being weighed and filled, and then capped preliminary to the soldering. The capping operation, which is carried out by means of a suitable machine, consists in applying the cap or lid to the can and curling the adjacent flanges of the cap and can together to form a double seam. This seam extends about the upper peripheral margin of the can. The solder is applied as a paste along the seam around the periphery of the can by means of a brush. As previously stated, the solder is preferably an alloy of tin (30%) and lead (70%) and contains a suitable flux, and has a melting point of the same order as the tin plate of the can. The can is then placed cap down in the cavity 14 of the worktable so that it rests on the plunger 38. The weight of the can depresses the plunger and closes the Micro-Switch 37.

The closing of the Micro-Switch 37 serves to energize the relay 34, thereby connecting the power generator 26 to the work coil 19 through the output transformer 31. Closing of the switch also starts the timing motor 47, and puts on the light 46, which may be green in color, and which is preferably positioned so as to be in full view of the operator. Connecting the power generator to the work coil makes the coil the equivalent of a high frequency transformer and the material of the can the equivalent of a short circuited secondary thereof. The area of the seam is rapidly heated up to about 500° F., and the tin plate and solder both fuse and seal up the gap in the periphery of the seam. The motor 47 may be adjusted in a well-known manner so as to open the switch 41 at any desired time interval. For the purpose of soldering the cap of a can, a time interval of 22 seconds has been found sufficient. When the switch 41 opens, the relay 34 is deenergized and the power generator is disconnected from the transformer 31, and hence from the work coil 19. The green light 46 goes off, and hence the operator takes the completed can off the plunger 38. This serves to deenergize the timing motor 47, and the switch 41 is automatically closed. When the next can is placed in position the cycle is repeated.

The method of the invention has many advantages. It is exceedingly simpler, cheaper, and faster than prior art methods and produces better and tighter seams. It has greatly improved working conditions in the plant where it is being used and has eliminated undesirable heat and smell. The results are more uniform and the completed cans are much more presentable, due in large measure to the fact that solder can be applied only where needed, only the coated portion of the seam is heated, the formation of tin oxide is eliminated, and the excess is readily washed off.

In conclusion, it is to be understood that the foregoing disclosure has been given for the purpose of exemplifying and illustrating the invention, which is claimed in the appended claims, and that said disclosure is not restrictive thereof.

I claim:

1. As an element of an electronic can soldering apparatus, a worktable formed of heat-resistant dielectric material, said table being provided with a substantially centrally disposed cavity having a contour corresponding to that of the can to be soldered and with an annular hole substantially concentric with the vertical wall of said cavity to receive the work coil of the apparatus.

2. As an element of an electronic can soldering apparatus, a worktable formed of heat-resistant dielectric material, said table being provided with a substantially centrally disposed cavity having a contour corresponding to that of the can to be soldered, with an annular hole substantially concentric with the vertical wall of said cavity to receive the work coil of the apparatus, and with a vertical hole in the floor of the cavity to receive the plunger of a switch.

3. As an element of an electronic can soldering apparatus, a worktable formed of heat-resistant dielectric material, said table being provided with a centrally disposed cavity having a contour corresponding to that of the can to be soldered, and a work coil in the form of an annulus embedded in the table concentric with the cavity.

4. The device defined in claim 3, the table being provided with a vertical hole in the floor of the cavity to receive the plunger of a switch.

5. As an element of an electronic can soldering apparatus, a worktable consisting of two superposed slabs of heat-resistant dielectric material, the upper slab being provided with a hole having a contour corresponding to that of the can to be soldered, the lower marginal edge of the upper slab about the hole being provided with a downwardly projecting lip which fits snugly into a groove of corresponding contour provided in the upper surface of the lower slab.

6. As an element of an electronic can soldering apparatus, a worktable consisting of two superposed slabs of heat-resistant dielectric material, the upper slab being provided with a hole having a contour corresponding to that of the can to be soldered, the lower marginal edge of the upper slab about the hole being provided with a downwardly projecting lip which fits snugly into a groove of corresponding contour provided in the upper surface of the lower slab and the lower surface of the upper slab being formed with a groove, which is substantially concentric with the wall of the hole in the upper slab, to receive the work coil of the apparatus.

7. As an element of an electronic can soldering apparatus, a worktable consisting of two superposed slabs of heat-resistant dielectric material, the upper slab being provided with a hole having a contour corresponding to that of the can to be soldered, the lower marginal edge of the upper slab about the hole being provided with a downwardly projecting lip which fits snugly into a groove of corresponding contour provided in the upper surface of the lower slab, the lower surface of the upper slab being formed with a groove, which is substantially concentric with the wall of the hole in the upper slab, to receive the work coil of the apparatus, and the lower slab being provided substantially centrally of the hole in the upper slab with an aperture to receive the plunger of a switch.

8. An apparatus for electronically soldering cans, said apparatus comprising a work coil having the shape of the can to be soldered, the ends of said coil being electrically connected to the circuit of an electronic power generator, a relay for controlling the current from the generator to the coil, and a switch for controlling said relay, said switch being provided with an actuating plunger, said plunger being disposed within said coil so as to be actuated when a can is placed within said coil.

9. An apparatus for electronically soldering cans, said apparatus comprising a work coil having the shape of the can to be soldered, the ends of said coil being electrically connected to the circuit of an electronic power generator, the circuit between the work coil and the power generator being provided with a normally open switch and a normally closed switch, the normally open switch being adapted to be closed by the positioning of a can within the coil, and the normally closed switch being time-controlled so as to be opened automatically at the end of the heating cycle and being adapted to be closed again by the removal of a can from within said coil.

10. An apparatus for electronically soldering cans, said apparatus comprising a work coil having the shape of the can to be soldered, the ends of said coil being electrically connected to the circuit of an electronic power generator, a relay for controlling the current from the generator to the coil, a switch for controlling said relay, said switch being provided with an actuating plunger, said plunger being disposed within said coil so as to be actuated when a can is placed within said coil, a second normally closed switch, and time controlled means for automatically opening said second switch at the end of a predetermined time interval.

11. An apparatus for electrically soldering cans, said apparatus comprising a work coil having the shape of the can to be soldered, the ends of said coil being electrically connected to the circuit of an electronic power generator, a relay for controlling the current from the generator to the coil, a switch for controlling said relay, a second normally closed switch, and time-controlled means for automatically opening said second switch at the end of a predetermined time interval.

12. The apparatus defined in claim 11, said apparatus being provided with a means for again closing said second switch.

13. An apparatus for electronically soldering cans, said apparatus comprising a work coil having the shape of the can to be soldered, the ends of said coil being electrically connected to the circuit of an electronic power generator, the circuit between the work coil and the generator being provided with a normally open switch and a normally closed switch, means operable by the positioning of a can within said coil to close said normally open switch, time-controlled means to open said normally closed switch at the end of the heating cycle, and to close it again at the beginning of the next heating cycle.

14. An apparatus for electronically soldering cans, said apparatus comprising a work coil having the shape of the can to be soldered, the ends of said coil being electrically connected to the circuit of an electronic power generator, the circuit between the work coil and the generator being provided with two switches, the first of said switches being normally open and being provided with an actuating plunger within said coil so as to be closed when a can is placed within said coil, the second of said switches being time-controlled so as to be opened at the end of the heating cycle, and connections between the actuating plunger and said second switch to close said second switch again when a can is removed from within said coil.

KARL SEILER, 3RD.

REFERENCES CITED

The following references are of record in the file of this patent:

UNITED STATES PATENTS

| Number | Name | Date |
|---|---|---|
| 1,004,847 | Brach | Oct. 3, 1911 |
| 2,385,904 | Witty | Oct. 2, 1945 |
| 2,425,115 | Mulvany | Aug. 5, 1947 |

OTHER REFERENCES

Taylor, "Electronics," February 1944, pages 114–117.